(12) United States Patent
Allaire

(10) Patent No.: US 8,302,710 B2
(45) Date of Patent: Nov. 6, 2012

(54) VEHICLE SUSPENSION SYSTEM

(75) Inventor: Marius Allaire, Chicoutimi (CA)

(73) Assignee: L'Equipe Fabconcept Inc., Chicoutimi (CA)

( * ) Notice: Subject to any disclaimer, the term of this patent is extended or adjusted under 35 U.S.C. 154(b) by 296 days.

(21) Appl. No.: 12/708,525

(22) Filed: Feb. 18, 2010

(65) Prior Publication Data

US 2010/0237574 A1    Sep. 23, 2010

Related U.S. Application Data

(60) Provisional application No. 61/202,322, filed on Feb. 18, 2009.

(51) Int. Cl.
*B62D 55/00* (2006.01)

(52) U.S. Cl. ............... 180/9.54; 280/124.135; 305/134

(58) Field of Classification Search .......... 180/9.5, 180/9.54; 280/124.135; 305/134
See application file for complete search history.

(56) References Cited

U.S. PATENT DOCUMENTS

| | | | |
|---|---|---|---|
| 3,147,024 A * | 9/1964 | Brockman | 280/81.1 |
| 7,111,857 B2 * | 9/2006 | Timoney et al. | 280/124.128 |
| 7,172,257 B2 | 2/2007 | Tamaru | |
| 8,083,242 B2 | 12/2011 | Brazier | |
| 2003/0117017 A1 | 6/2003 | Holf | |
| 2007/0169968 A1 * | 7/2007 | Todd et al. | 180/9.1 |
| 2009/0230650 A1 * | 9/2009 | Mayen et al. | 280/124.1 |
| 2010/0230184 A1 | 9/2010 | Allaire | |
| 2010/0237574 A1 | 9/2010 | Allaire | |
| 2010/0237658 A1 | 9/2010 | Allaire | |
| 2011/0036649 A1 * | 2/2011 | Cho et al. | 180/9.5 |

FOREIGN PATENT DOCUMENTS

| | | |
|---|---|---|
| CA | 2693511 | 8/2010 |
| CA | 2693685 | 8/2010 |
| CA | 2775863 | 8/2010 |

OTHER PUBLICATIONS

Office Action dated Nov. 18, 2011 in U.S. Appl. No. 12/708/430, filed Feb. 18, 2010.

* cited by examiner

*Primary Examiner* — Kevin Hurley
(74) *Attorney, Agent, or Firm* — Mathieu Audet

(57) ABSTRACT

A suspension system adapted to receive an endless belt drive is provided, the suspension system comprising a first wishbone adapted to be secured at a first end thereof to a frame of a vehicle a second wishbone adapted to be secured at a first end thereof to the frame, a hub connecting the first wishbone and the second wishbone at second ends thereof, a tandem member pivotally secured to the hub, and at least one pair of wheels attached to the tandem member, the at least one pair of wheels being adapted to contact the endless belt to support the vehicle. A method of using same and a kit providing same are also provided.

22 Claims, 16 Drawing Sheets

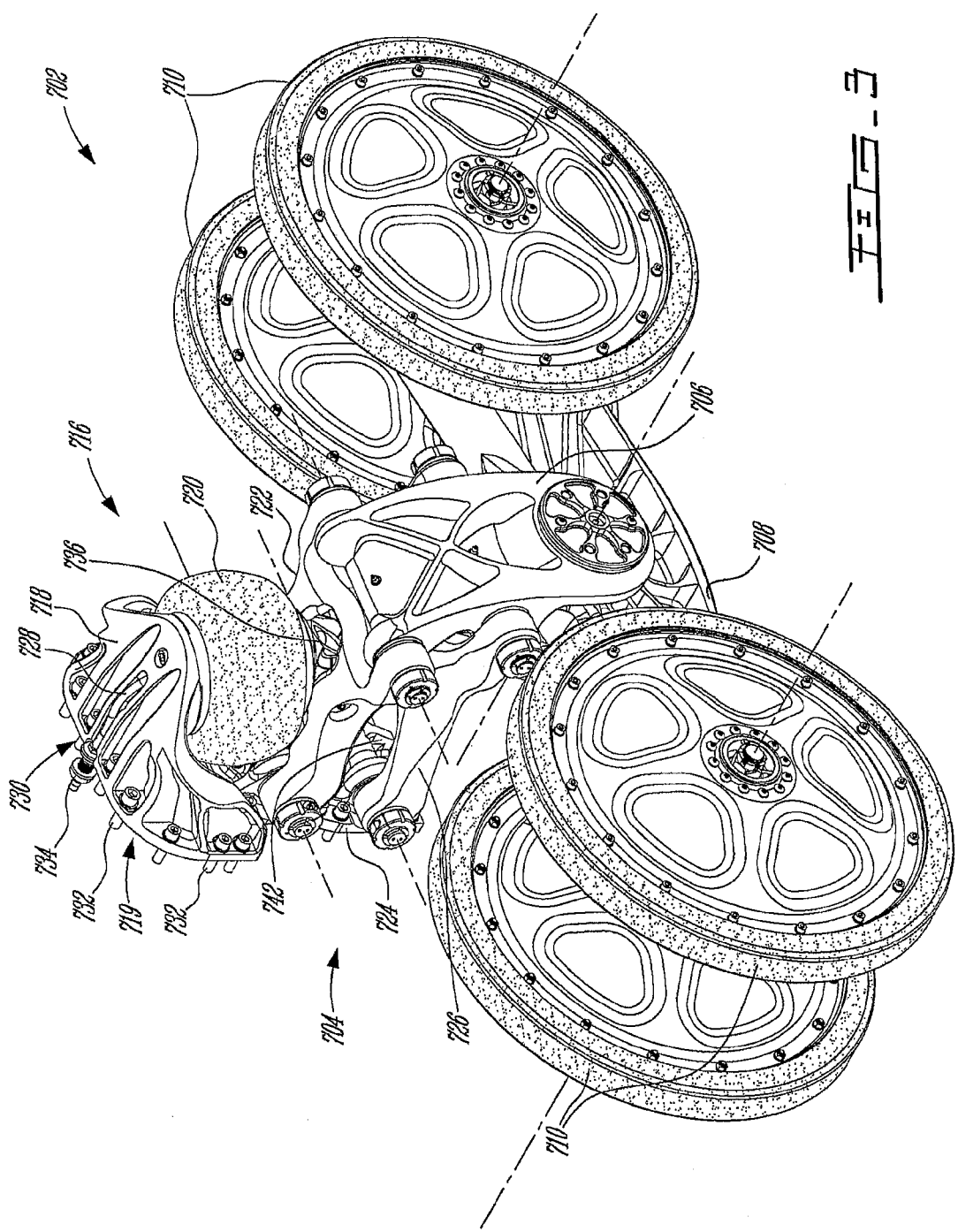

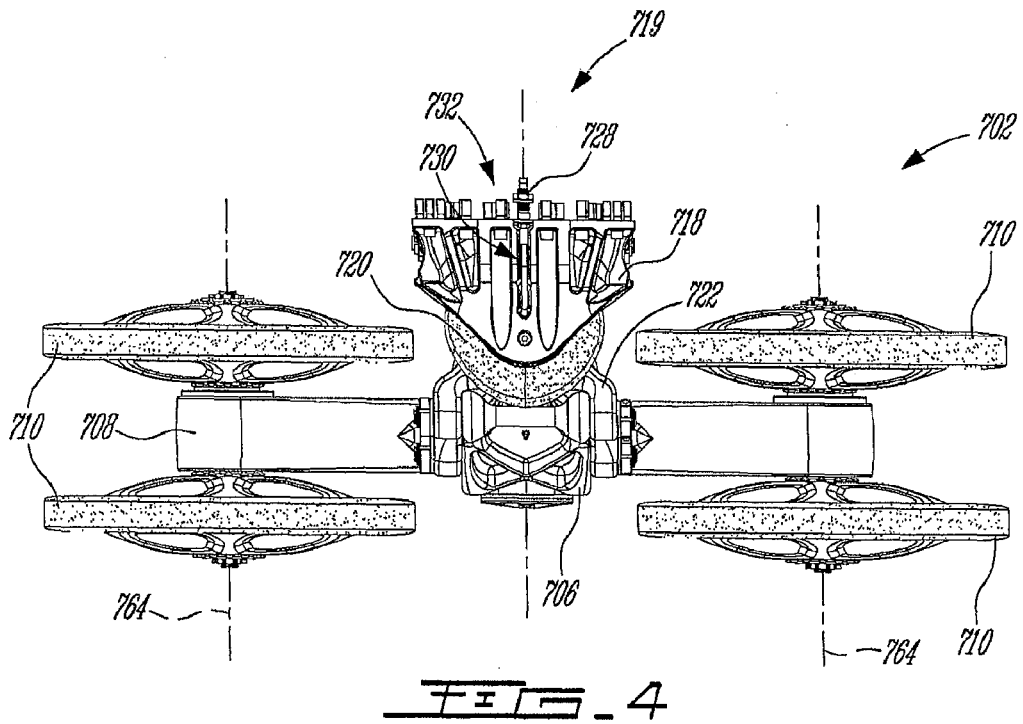
FIG_4
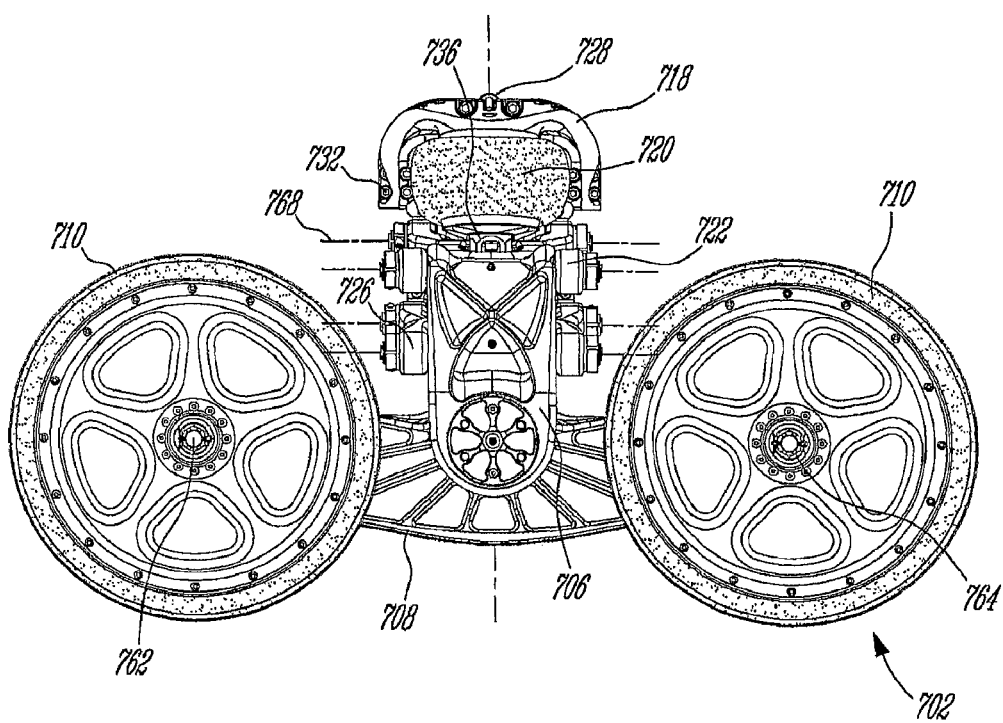
FIG_5

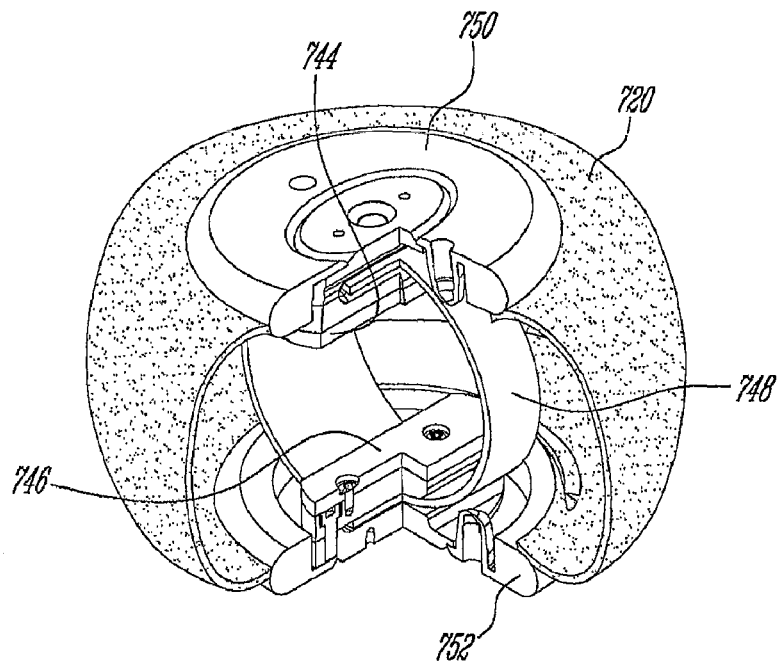
FIG_7
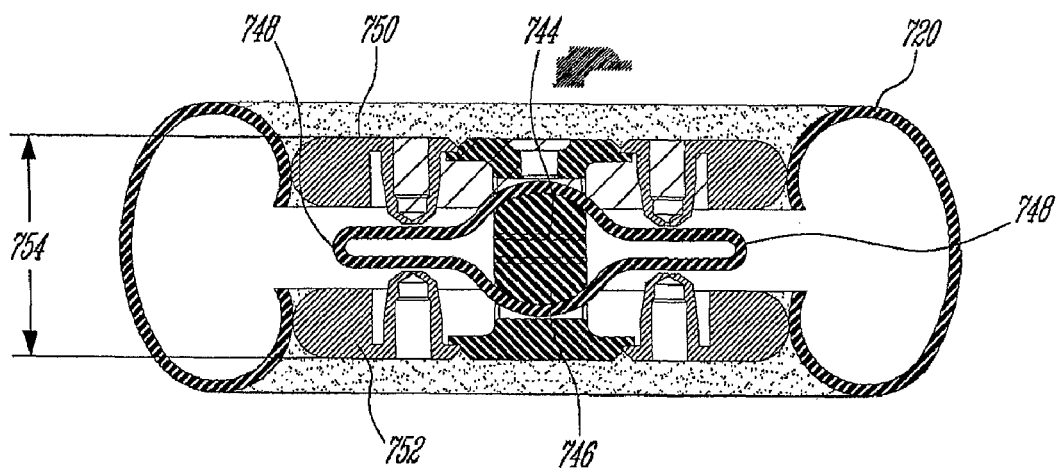
FIG_8

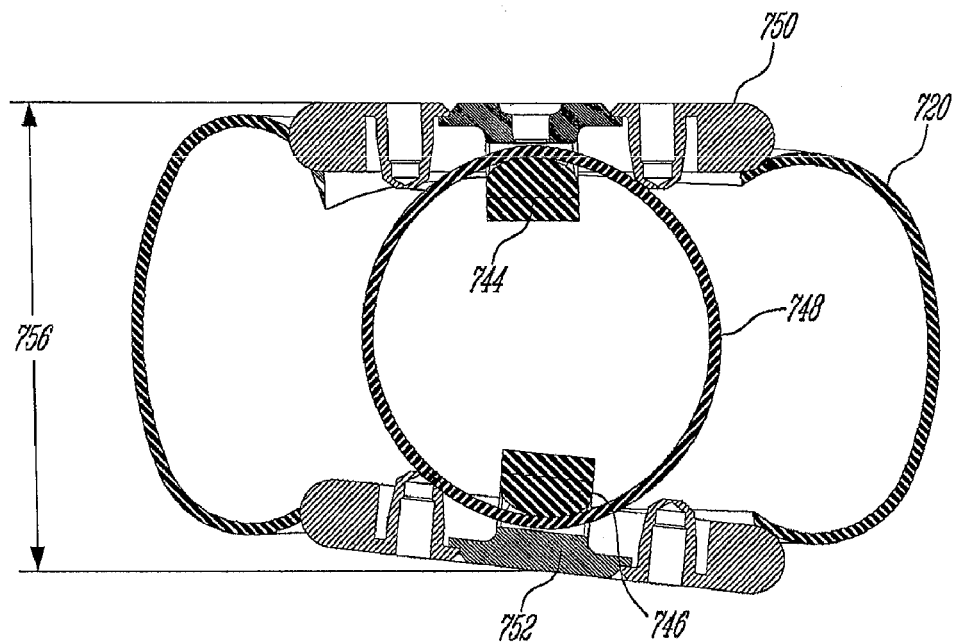
FIG_9
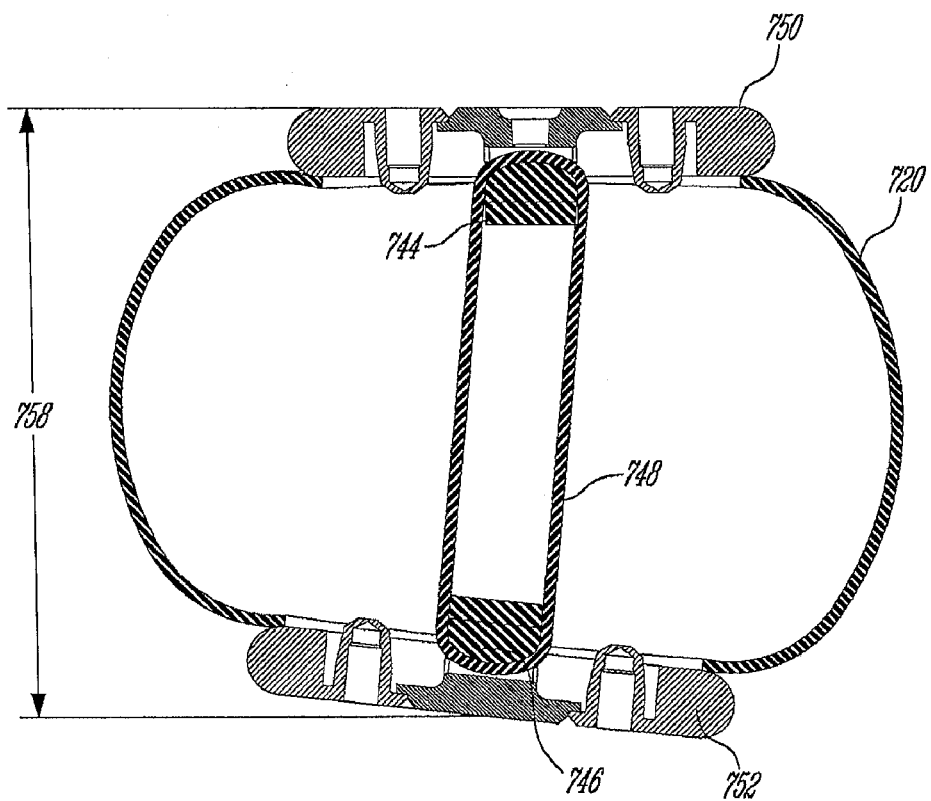
FIG_10

FIG_14

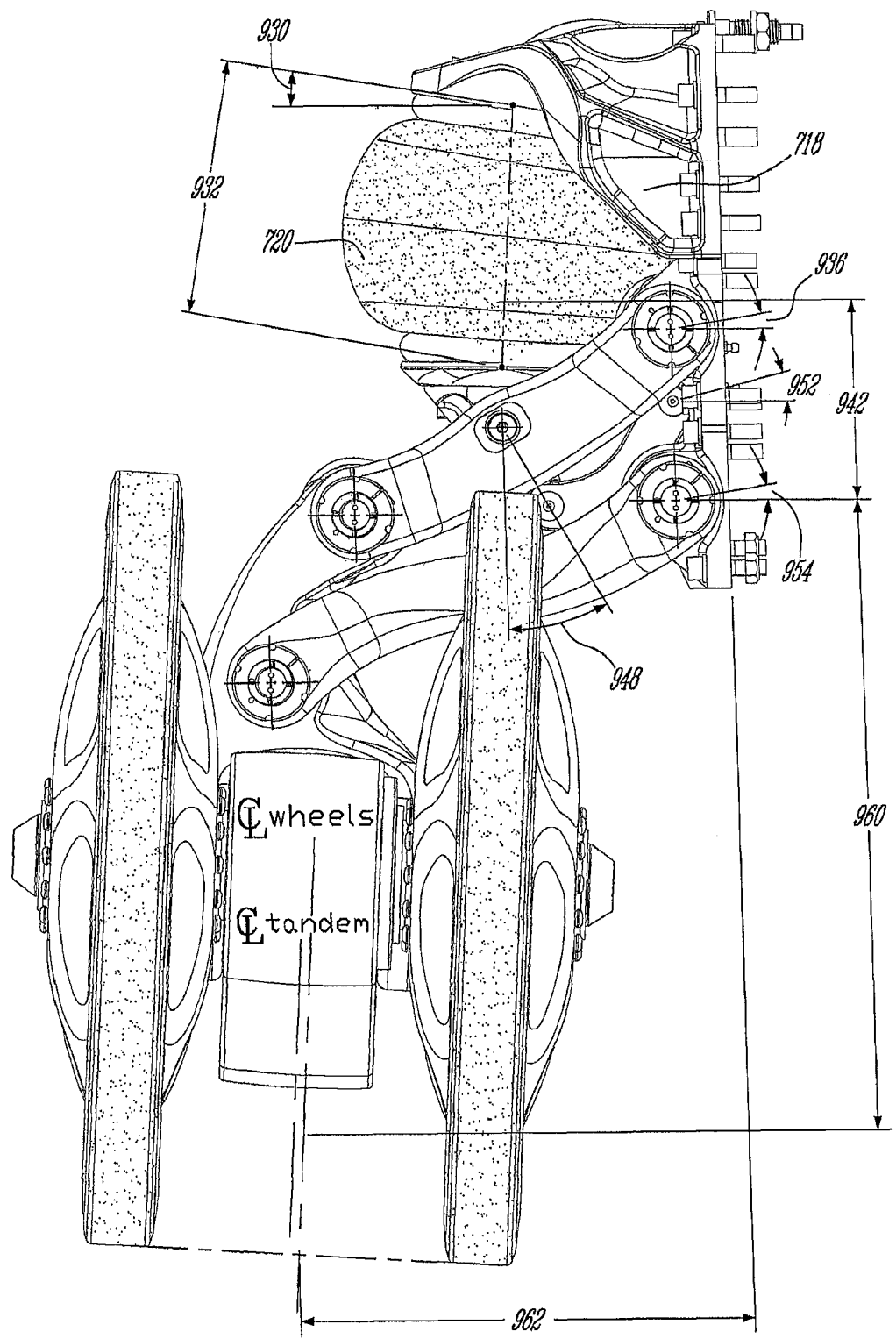
FIG_17

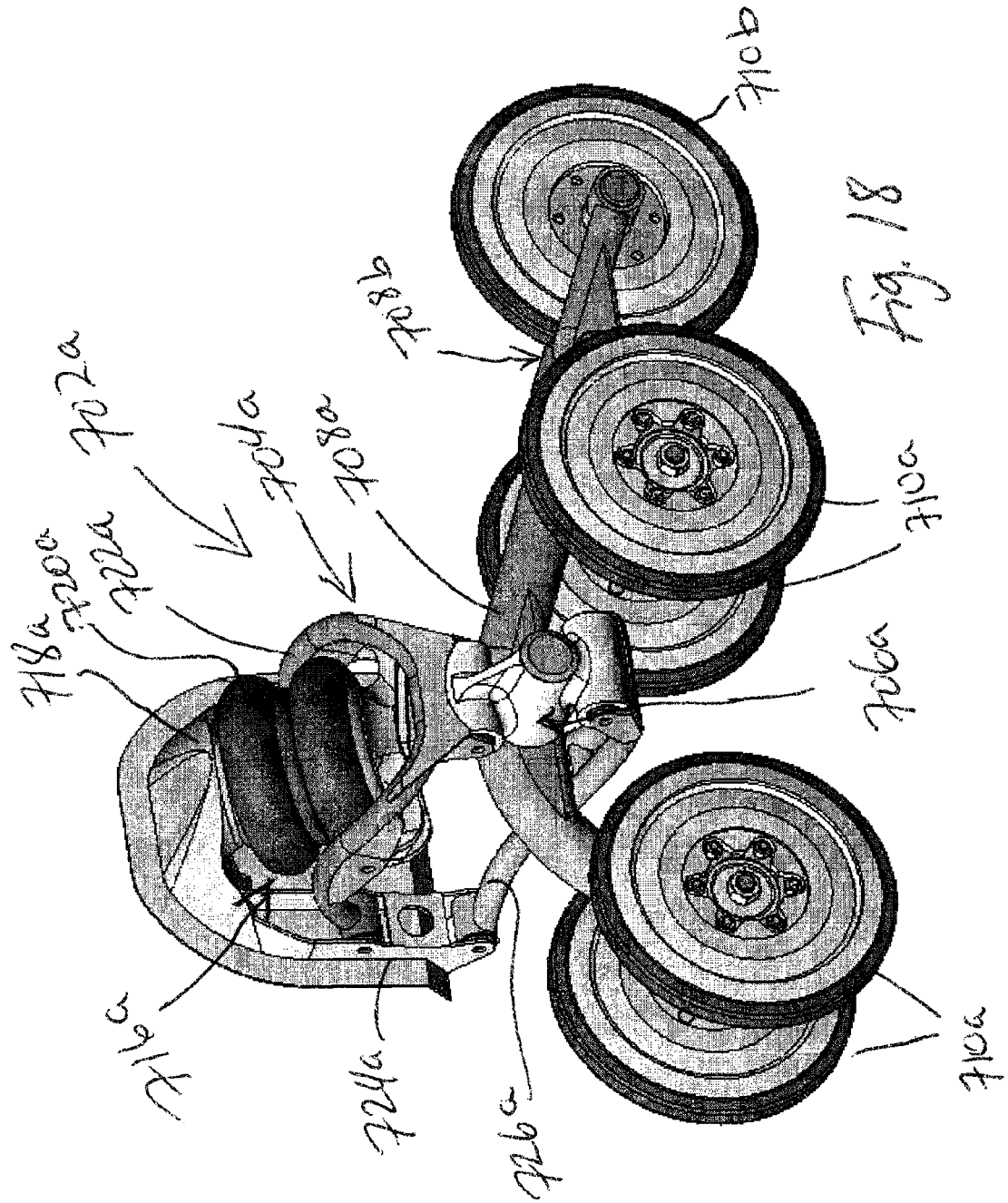

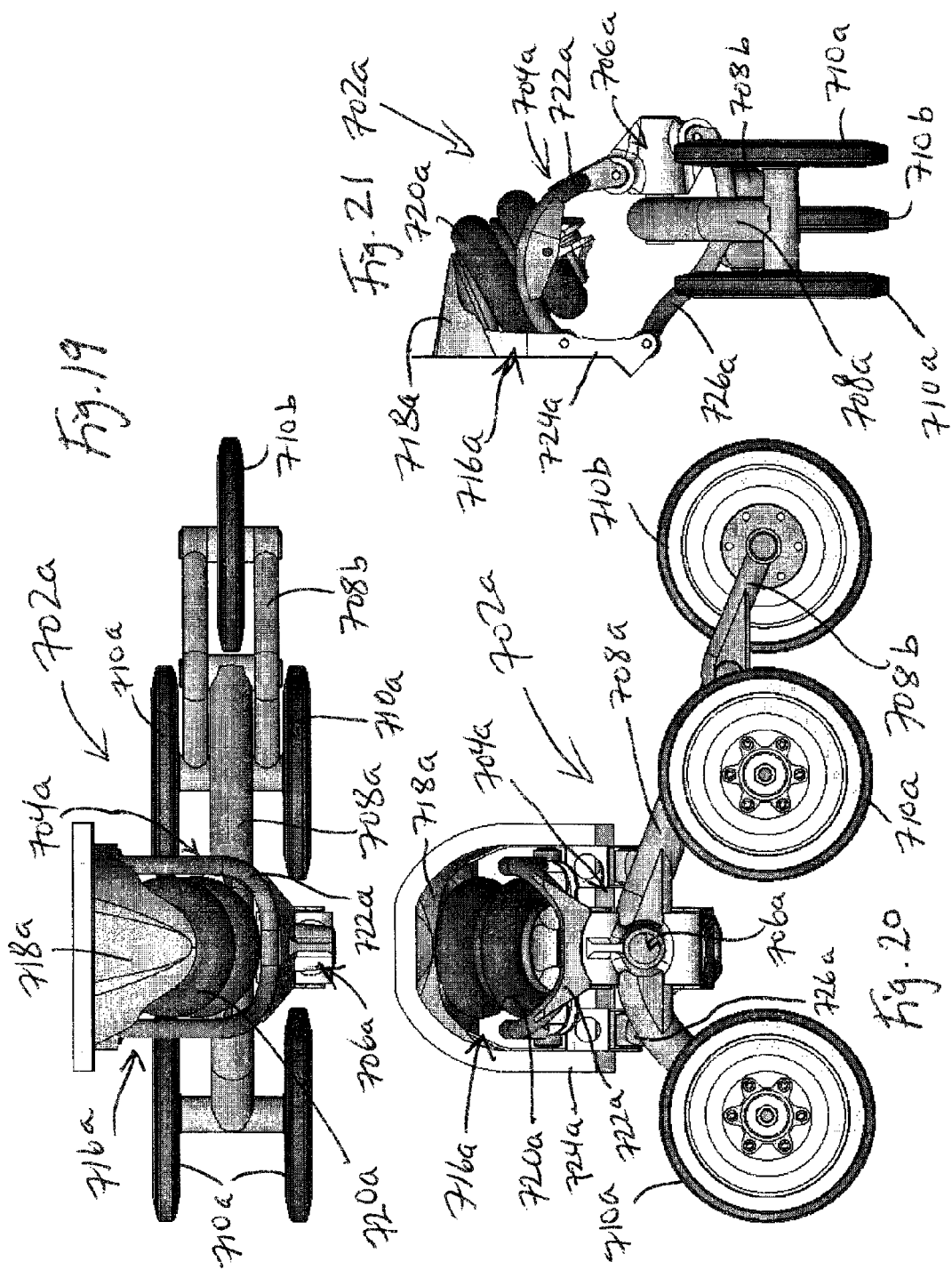

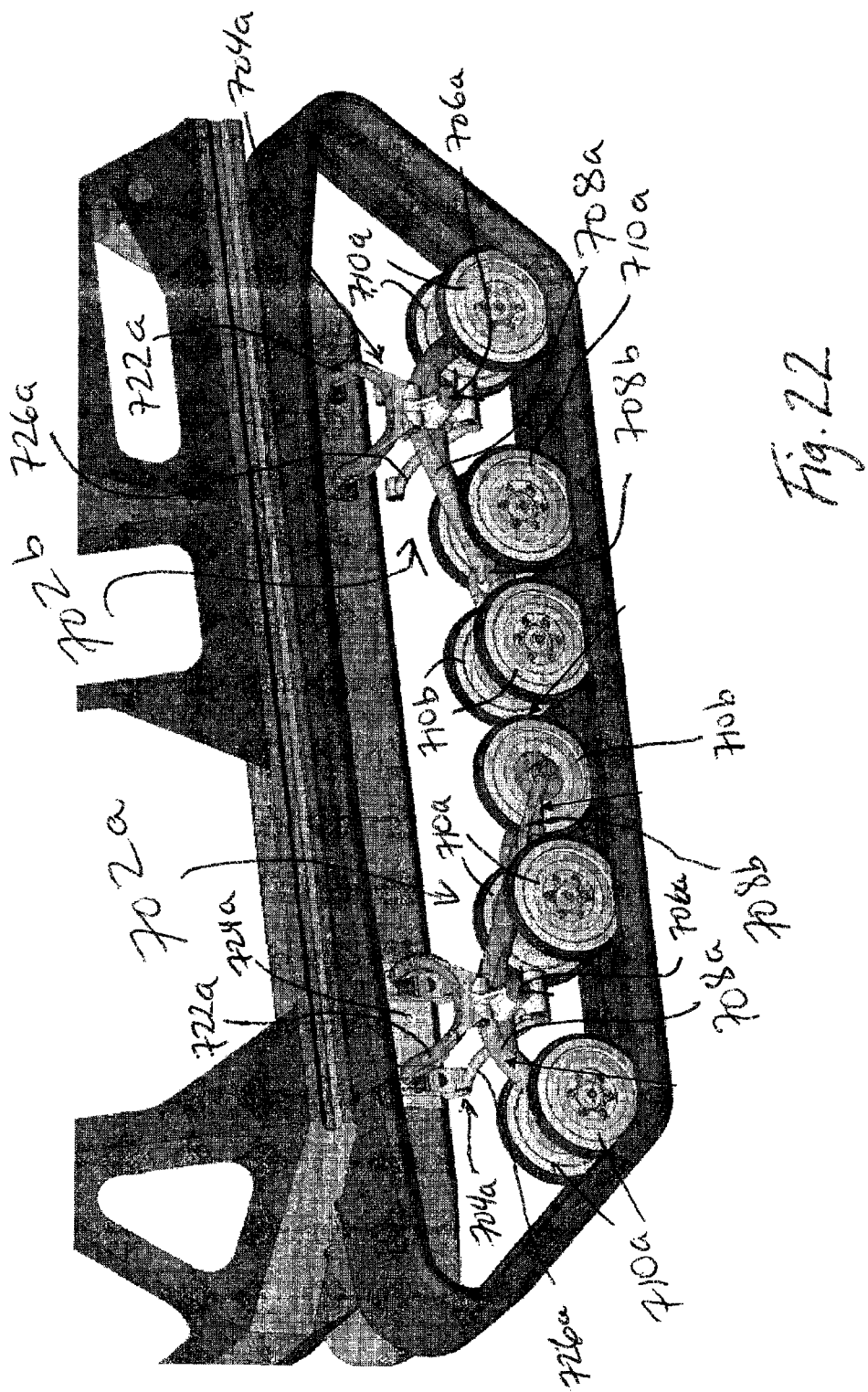

VEHICLE SUSPENSION SYSTEM

CROSS REFERENCE TO RELATED APPLICATIONS

This Application claims priority on U.S. Provisional Application No. 61/202,322, filed on Feb. 18, 2009, which is herein incorporated by reference.

FIELD OF THE INVENTION

The present invention generally relates to an all-terrain vehicle. More precisely, the present invention relates to a suspension system for an endless belt-driven all-terrain vehicle.

BACKGROUND OF THE INVENTION

Vehicles equipped with endless belt drives are adapted to be used on various types of grounds. Endless belt drives, or caterpillars, are replacing or complementing weight supporting wheels to reduce ground contacting pressure and improve floatation and traction on soft grounds.

Each endless belt is generally installed on a set of wheels and/or bearing members supporting and positioning the endless belt on the vehicle. At least one powered wheel, commonly called a sprocket, engages the endless belt to transmit movement to the endless belt and propel the vehicle. Other optional endless belt supports can also be used to ensure proper operation of the endless belt drive.

The weight-supporting wheels are affixed to a suspension system adapted to absorb ground imperfections of rugged terrains and provide a smoother ride to occupants of the vehicle. A wide-travel suspension system generally allows the passage of significant ground obstacles. However, wide travel suspensions significantly affect the tension of the endless belt and increase the risk of disengaging the endless belt from its drive sprocket and/or coming off its weight supporting wheels. Wide travel suspensions also have an effect on the useful life of the endless belt.

A need, therefore, exists for an improved suspension system for the endless belts of all-terrain vehicles.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description of exemplary embodiments, which is presented later.

A suspension system of the present invention (including a kit therefor) may, by way of example, be exploited in relation to an all-terrain vehicle. However, the suspension system of the present invention may be used in relation to other vehicles adapted to serve in contexts that differ from the embodiments illustrated hereinafter.

It is to be understood herein that the term all-terrain vehicle generally refers to an off-road vehicle although the vehicle could alternatively be used on the road. It is further understood that the term endless belt generally refers to a caterpillar-type drive adapted to impart motive power from the vehicle to the ground by a means that provides a wider ground footprint than a wheel. An endless belt, or a caterpillar, can be made of articulated steel parts, rubber, composite materials (woven material and rubber) or other material suitable to this end.

Therefore, one object of the present invention improves at least some of the deficiencies associated with an endless belt suspension intended to be adapted to an all-terrain vehicle.

Another object of the present invention provides an endless belt suspension system that offers a wide travel suspension while preventing the endless belt from coming off its proper operating position.

An object of the present invention provides an endless belt suspension system that offers a wide travel suspension while preventing the endless belt from wearing out prematurely.

One object of the present invention provides an endless belt suspension system that provides limited camber angle variations along the travel of the suspension.

An additional object of the present invention provides an endless belt suspension system that allows high suspension travel thereof.

One additional object of the present invention provides an endless belt suspension system that requires low maintenance and assists in preventing debris from influencing its useful life.

A first aspect of the present invention provides an endless belt suspension system that uses a double wishbone (upper and lower A-arms) suspension.

A second aspect of the present invention provides an endless belt suspension system that uses tandem-mounted endless belt-supporting wheels.

A third aspect of the present invention provides an endless belt suspension system that uses a pneumatic suspension mechanism.

Another aspect of the present invention provides an endless belt suspension system that uses a dynamic pressure pneumatic suspension mechanism.

One another aspect of the present invention provides an endless belt suspension system that uses an auxiliary fluid reservoir coupled to the pneumatic suspension mechanism.

An aspect of the present invention provides an endless belt suspension system allowing at least about 200 millimeters of vertical suspension travel.

An aspect of the present invention provides an endless belt suspension system allowing less than about 5° of camber variation along the travel of the suspension.

One another aspect of the present invention provides a tandem mechanism adapted to pivot at least about 20° on each side from the horizontal.

Another aspect of the present invention provides a double wishbone suspension mechanism adapted to provide a vertical travel of at least about 200 millimeters.

One aspect of the present invention provides a vertical travel of the combined double wishbone suspension mechanism and tandem mechanism of at least about 480 millimeters.

An aspect of the present invention provides an adjustable pressure pneumatic airbag.

Yet another aspect of the present invention provides an auxiliary fluid reservoir operatively connected to the pneumatic airbag that acts as a shock absorber or a shock damper.

One other aspect of the invention provides a pneumatic suspension coupled to a damper to further control the action of the suspension.

Therefore, in accordance with the present invention, there is provided a suspension system for an endless belt drive, the suspension system comprising a first wishbone adapted to be secured to a frame of a vehicle; a second wishbone adapted to be secured to the frame; a hub connecting the first wishbone and the second wishbone remotely from the frame; a tandem member pivotally secured to the hub; and at least one pair of wheels attached to the tandem member, the at least one pair of wheels being adapted to contact the endless belt to support the vehicle.

Additionally, there can be provided at least a second tandem member pivotally secured to the first tandem member.

Also in accordance with the present invention, there is provided a method for suspending a vehicle, the method comprising providing a tandem set of wheels; providing a double wishbone suspension to support the tandem set of wheels; and providing a compressible member, such as a pneumatic airbag, to define the position of the tandem set of wheels.

Further in accordance with the present invention, there is provided a suspension kit comprising a tandem set of wheels; a double wishbone suspension to support the tandem set of wheels; and a compressible member, such as a pneumatic airbag, to define the position of the tandem set of wheels.

Other objects, aspects, advantages and features of the present invention will become more apparent upon reading of the following non-restrictive description of embodiments thereof, given by way of example only with reference to the accompanying drawings.

BRIEF DESCRIPTION OF THE DRAWINGS

Reference will now be made to the accompanying drawings, showing by way of illustration an illustrative embodiment of the present invention, and in which:

FIG. 3 is an isometric view of a suspension unit of the all-terrain vehicle of FIG. 1;

FIG. 4 is a top plan view of the suspension unit of FIG. 3;

FIG. 5 is a side elevation view of the suspension unit of FIG. 3;

FIG. 6 is an isometric exploded view of the suspension unit of FIG. 3;

FIG. 7 is an isometric view, with a portion removed, of a pneumatic bag of the suspension unit of FIG. 3;

FIG. 9 is a cross-sectional view of the pneumatic bag of FIG. 7, shown in a shock absorbing state thereof;

FIG. 10 is a cross-sectional view of the pneumatic bag of FIG. 7, shown in an extended state thereof;

FIG. 17 is an elevation view of the suspension unit of FIG. 3 in its lowermost position;

FIG. 18 is an angled view of a variant suspension unit of an all-terrain vehicle;

FIG. 19 is a top plan view of the suspension unit of FIG. 18;

FIG. 20 is a side elevation view of the suspension unit of FIG. 18;

FIG. 21 is a front view of the suspension unit of FIG. 18; and

FIG. 22 is a schematic angled view of the suspension unit of FIG. 18 shown mounted to the all-terrain vehicle, and also showing a further variant suspension unit.

DESCRIPTION OF ILLUSTRATIVE EMBODIMENTS OF THE INVENTION

Figure 1:
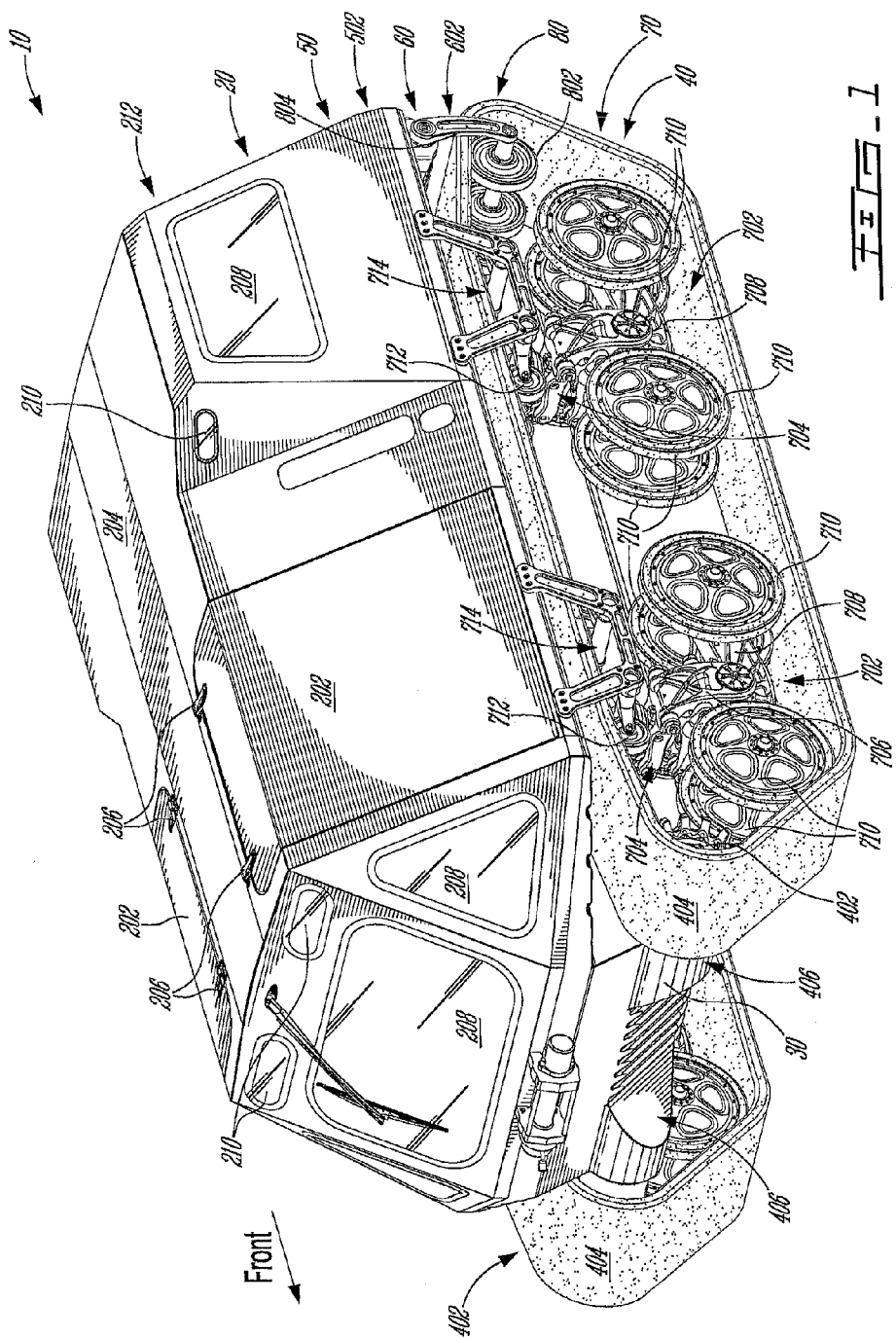
FIG. 1 is a front-right isometric view of an all-terrain vehicle.

The present invention will now be described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details.

Figure 2:
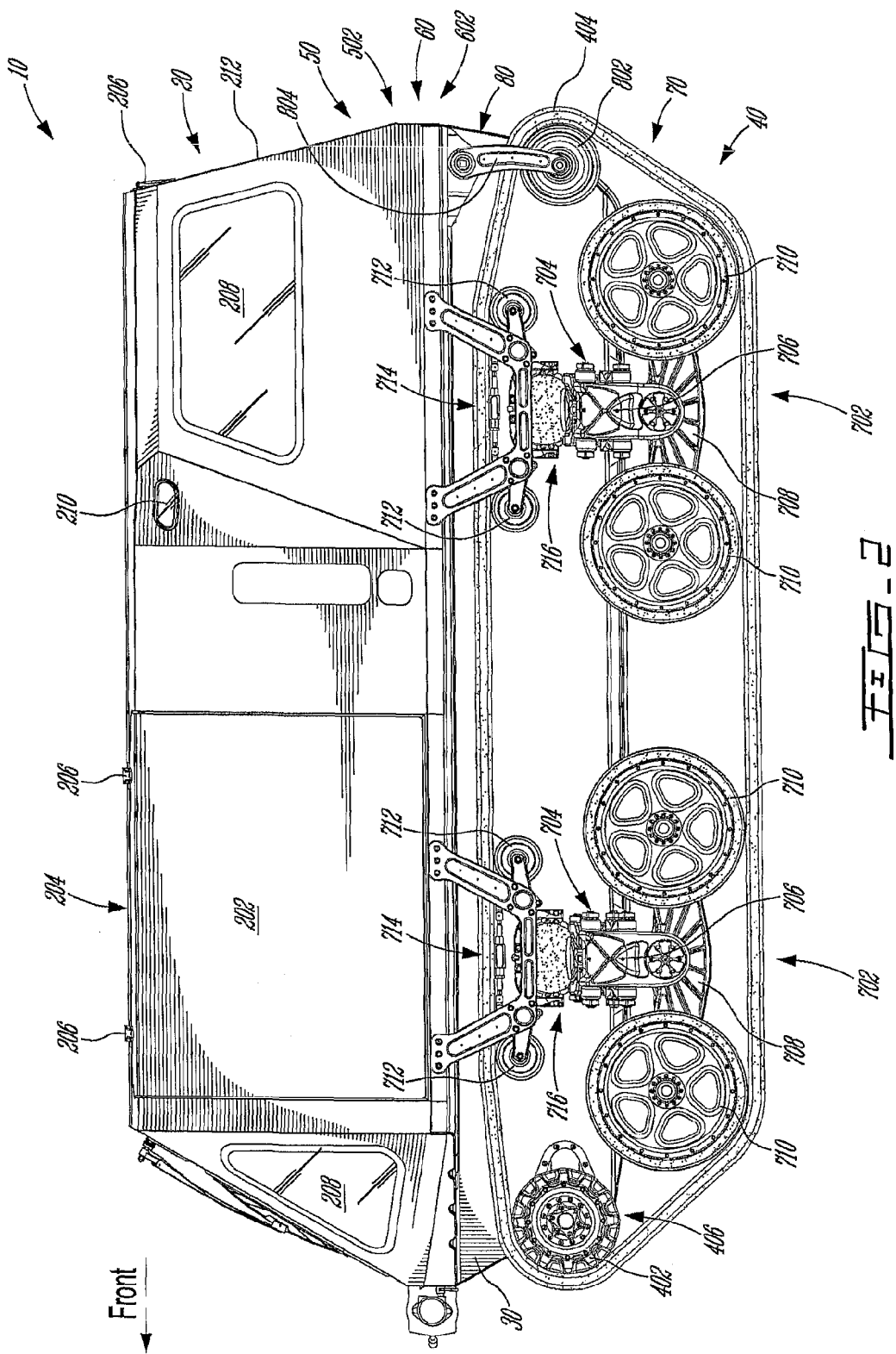
FIG. 2 is a right side elevation view of the all-terrain vehicle of FIG. 1.

Thus, an embodiment of the invention is shown on FIGS. 1 and 2 illustrating an all-terrain vehicle 10. The all-terrain vehicle 10 is constituted, inter alia, of a passenger compartment 20, a frame 30, a drive system 40, a power pack 50, a hydraulic system 60, a suspension system 70 and a tensionner system 80. The passenger compartment 20 is provided with doors 202 pivotally secured on each side of a roof portion 204 via hinges 206, windows 208 disposed on the periphery of the vehicle 10, a back door 212 and a plurality of lights 210.

Manufacturing of the passenger compartment 20 of the illustrated embodiment is generally made in aluminum material for reasons of strength and weight. Other material, like steel, plastic or composite materials, could be used within the scope of the present invention without departing therefrom.

The passenger compartment 20 is mounted to the frame 30 thus forming a monocoque construction that enhances the rigidity and the strength of the overall vehicle assembly. Most parts of the vehicle assembly can be fastened, glued, welded, riveted or secured by other suitable means known in the art of vehicle manufacturing. The doors 202 are provided with a translucid portion that provides extended see-through area.

The power pack 50 is housed in and secured to the frame 30. The power pack 50 is preferably located low in the frame 30 to keep the center of gravity of the vehicle 10 as low as possible. Preferably, the power pack 50 is transversally centered in the vehicle 10 for reasons of lateral weight distribution. The longitudinal position of the power pack 50 can vary in accordance with the desired mass distribution and volume allocation. In this respect, the power pack 50 can be disposed in the center of the vehicle 10 to advantage mass distribution. In contrast, the power pack can be positioned toward the rear of the frame 30 to allow maximum room therein for passengers.

An internal combustion engine 502, e.g. a diesel or gas engine, powers a hydraulic system 60 via a rotating or reciprocating hydraulic pump 602. The internal combustion engine 502 could alternatively power more than one hydraulic system 60 and/or hydraulic pumps 602. More than one hydraulic pump 602 and/or hydraulic systems 60 might be desirable for reasons of safety if the vehicle 10 is expected to be used in extreme circumstances by offering redundant systems. The pressurized hydraulic system 60 powers hydraulic motors 406 that, in turn, mechanically power the drive system 40 via sprockets 402, which are engaged to endless belts 404. Intermediate planetary gearboxes (not shown) reduce the ratio between each hydraulic motor 406 and its associated sprocket 402. The sprockets 402 of the drive system 40 propel the vehicle 10 by turning the endless belts 404. Two hydraulic motors 406 are installed in the vehicle 10, each moving one of the two endless belts 404. The vehicle 10 is steered by a difference in rotation of the two hydraulic motors 406.

Still referring to FIG. 1 and FIG. 2, the suspension system 70 comprises a plurality of suspension units 702. Each suspension units 702 uses a double wishbone configuration 704 coupled on a proximal side to the frame 30 of the vehicle 10 and, on a distal side, to a hub 706. The hub 706 pivotally accommodates a tandem 708 to which are rotatably secured suspension wheels 710. Support wheels 712 are provided on an endless belt upper support 714 to maintain the upper side of the endless belt 404 on its way toward the front of the vehicle 10.

Tension in the endless belt 404 is managed by the tensionner system 80. Tension wheels 802 are adapted to move along the radius generated by tension lever 804 thus extending or retracting the circumference of the endless belt 404. The tensionner system 80 is adapted to provide proper tension in the endless belt 404 by dynamically adapting to operating conditions of the vehicle 10.

As better seen on FIGS. 3 through 5, it can be appreciated that the vehicle suspension system 70 uses a pneumatic suspension mechanism 716 to define the height of the vehicle and absorb shocks. An upper pneumatic airbag support 718 adapted to receive a pneumatic airbag 720 thereto is secured to the frame 30. An upper wishbone 722 is pivotally connected to a wishbone support 724 at a first end thereof. Similarly, a lower wishbone 726 is pivotally connected to the wishbone support 724 at a first end thereof. Movements of the suspension unit 702 substantially vertically move the hub 706 by pivoting the two wishbones 722 about the wishbone support 724. Movements of the hub 706 are limited by the compression and the extension of the pneumatic airbag 720, which mostly depend on the load applied thereto.

The pneumatic airbag 720 contains a fluid, generally air, which is compressible. Other fluids, in gaseous or liquid phase, adapted to serve the present function are considered to be circumscribed by the present invention. Thus, compression of the pneumatic airbag 720 defines the height of the frame 30 in respect with the ground—or the lower portion of the endless belt 404. The volume of air inside the pneumatic airbag 720 is adapted to vary. Air inside the pneumatic airbag 720 can be added or removed via a pneumatic tube 728 preferably disposed in and protected by a recess 730 provided in the upper support 718.

Still referring to FIGS. 3 through 5, it can be appreciated that the rear planar surface 719 of the upper support 718 is secured to the frame 30 of the vehicle 10 using a series of bolts 732 or rivets. The pneumatic tube 728 is provided with a watertight seal e.g. a grommet or a junction fastener 734 to pass through the frame 30 in order to prevent any introduction of debris inside the frame 30 of the vehicle 10.

Turning now to FIG. 6, it can be appreciated that the lower portion of the pneumatic airbag 720 is secured to, and supported by, a lower support 736. The lower support 736 is pivotally affixed to the upper wishbone 722 via pivot axle 738 adapted to mate within a first opening 740 defined in the lower support 736. Two positioning levers 742, pivotally secured to the wishbone support 724, on a respective first end thereof, are pivotally secured to a second opening 744 disposed in the lower support 736, below the first opening 740, on a respective second end thereof. The positioning levers 742 contribute to the spatial location of the lower support 736 in function of the position of the hub 706 [in respect to the frame 30]. It also prevents, when the pneumatic airbag 720 has a low fluid pressure therein, to misplace the lower support 736 that could lack minimum support from a desinflated pneumatic airbag 720. It can also be appreciated that the pneumatic airbag 720 is connected to an auxiliary fluid reservoir 721 adapted to serve as a damper.

More detailed views of the pneumatic airbag 720 and surrounding parts are provided on FIGS. 7 through 10. Internal bumpers 744 and 746 are disposed inside the pneumatic airbag 720 to stop or limit compression movements of the pneumatic airbag 720. In the present embodiment, two urethane plastic parts are illustratively used. The pneumatic airbag 720 is also provided with a distance limiter member 748 disposed therein. The distance limiter member 748 is a flexible member that does not stretch under tension and limits the longitudinal expansion of the pneumatic airbag 720. In the present situation the distance limiter member 748 is a composite rubberized belt (nylon). The internal bumpers 744 and 746 and the distance limiter member 748 are attached to the upper airbag connector 750 and the lower airbag connector 752, which also ensure that the pneumatic airbag 720 is airtight.

Figure 8:
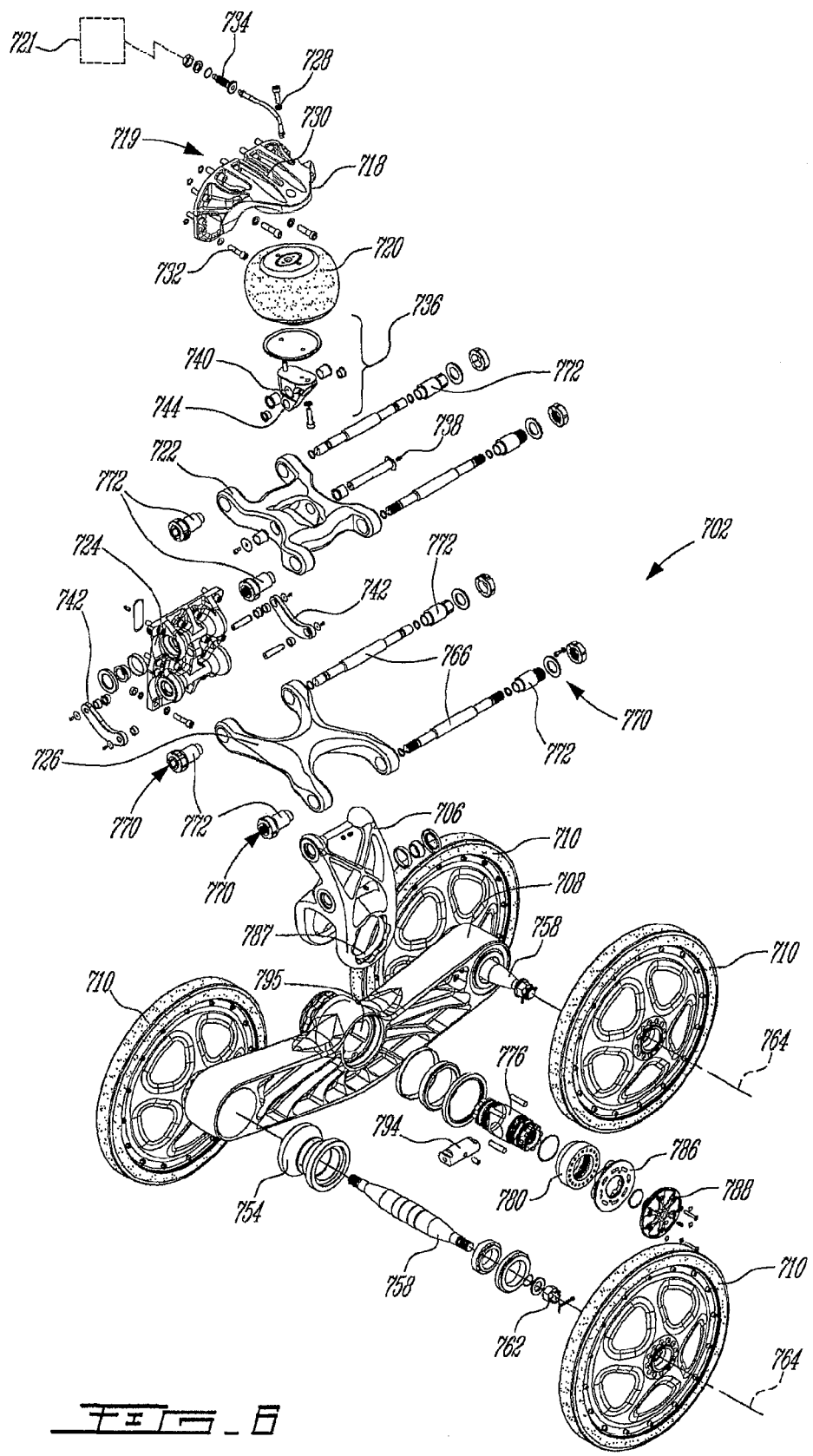
FIG. 8 is a cross-sectional view of the pneumatic bag of FIG. 7, shown in a compressed state thereof.

Still referring to FIGS. 8 through 10, it is possible to appreciate the pneumatic airbag 720 in three distinct states. Firstly, FIG. 8 illustrates the pneumatic airbag 720 in its compressed state 754 when the internal bumpers 744 and 746 are in contact. FIG. 9 illustrates the pneumatic airbag 720 in its shock absorbing state 756 where the internal bumpers 744 and 746 are not in contact and the distance limiter member 748 is not in tension. This is the state 756 where the pneumatic airbag 720 actually absorbs the shocks as a shock absorber. Lastly, the pneumatic airbag 720 is illustrated in its extended state 758 in FIG. 10. The extended state 758 is limited by the extension of the distance limiter member 748 therein. This state happens when the suspension becomes suddenly loadless and tends to extend over and beyond its operational extension.

Figure 11:
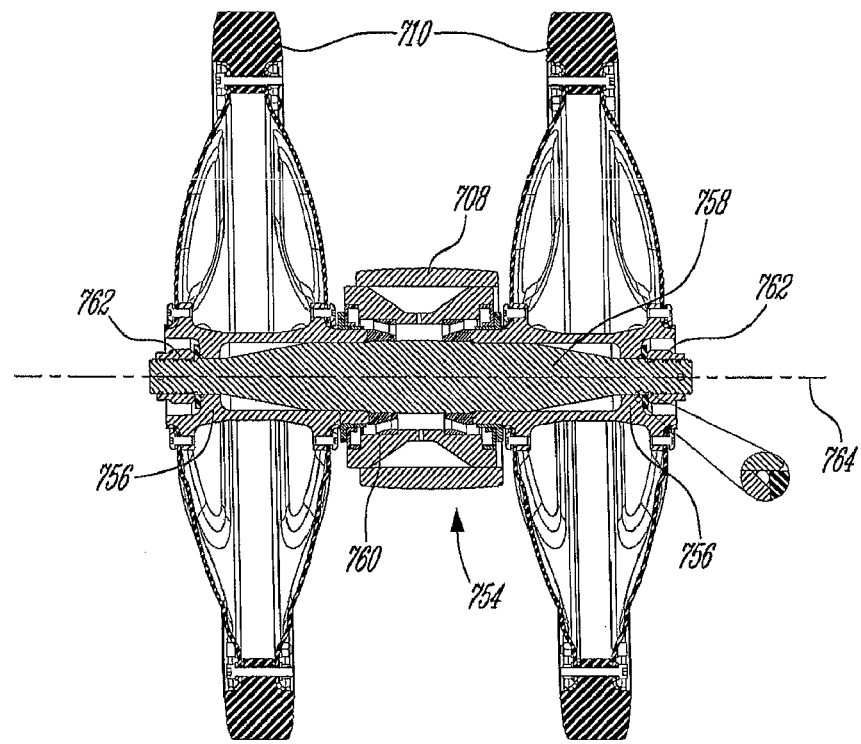
FIG. 11 is a cross-sectional view of a pair of supporting wheels of the suspension unit of FIG. 3.

Returning now in more details to the suspension wheels 710 of the suspension units 702 disposed in pairs on the tandem 708, FIG. 11 illustrates a cross-sectional view of the pair of suspension wheels 710 and its bearing mechanism 754 that allows rotational movements about the tandem 708. Each suspension wheel 710 is mounted to a suspension wheel hub 756 axially positioned on a suspension wheel axle 758. It is the suspension wheel axle 758 that rotates about a bearing unit 760 fixedly mounted in a corresponding opening in the tandem 708. The suspension wheel assembly is secured with a nut 762 disposed on each side of the suspension wheel axle 758. The torque applied on each nut 762 influences how tight the suspension wheel assembly is and also dictates the axial position of the suspension wheel axle 758 about its axis 764. Conical bearings are preferred in the present embodiment to provide a strong rotatable assembly capable of sustaining significant axial and radial stresses. Additionally, each bearing part is sealed to avoid introduction of undesirable foreign material inside the assembly.

Figure 12:
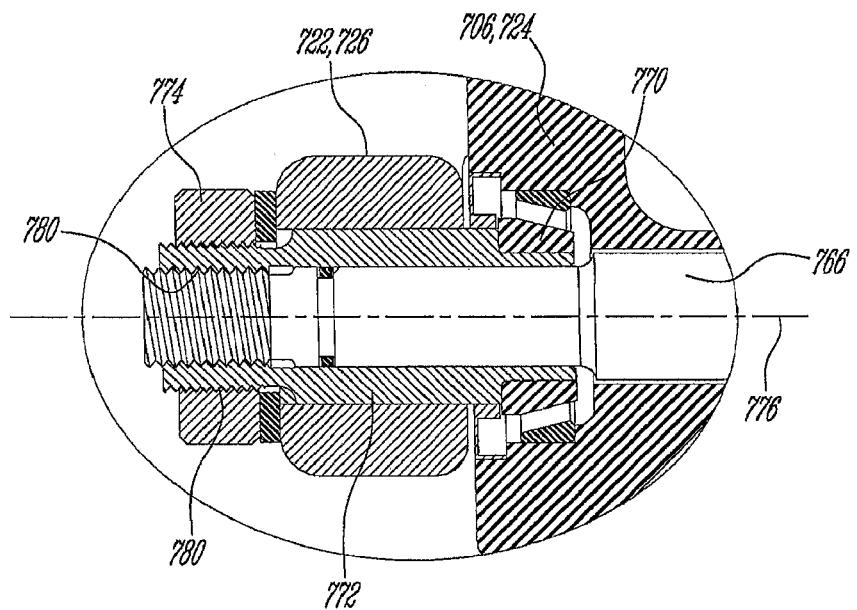
FIG. 12 is an enlarged cross-sectional view of a wishbone connecting portion of the suspension unit of FIG. 3.

FIG. 12 is a cross-sectional view illustrating another articulated portion of a suspension unit 702. As indicated above each wishbone 722 or 726 is pivotally secured to the wishbone support 724 (and the hub 706 in a comparable fashion) about a wishbone axle 766 defining a wishbone axis 768. In the illustrated embodiment the wishbone axle 766 is secured to the wishbone support 724 (and the hub 706) with an intervening bearing assembly 770. The bearing assembly 770 is independently secured and torqued to the wishbone support 724 (or the hub 706) with a bearing nut 772 that is also adapted to pivotally receive a wishbone 722, 726 thereto. The wishbones 722, 726 are secured in place to the bearing nut 772 with an additional collar nut 774. Cooperating threads 780 are used to secure the bearing nut 772 to the wishbone axle 766 and to secure the nut 774 to the bearing nut 772.

Figure 13:
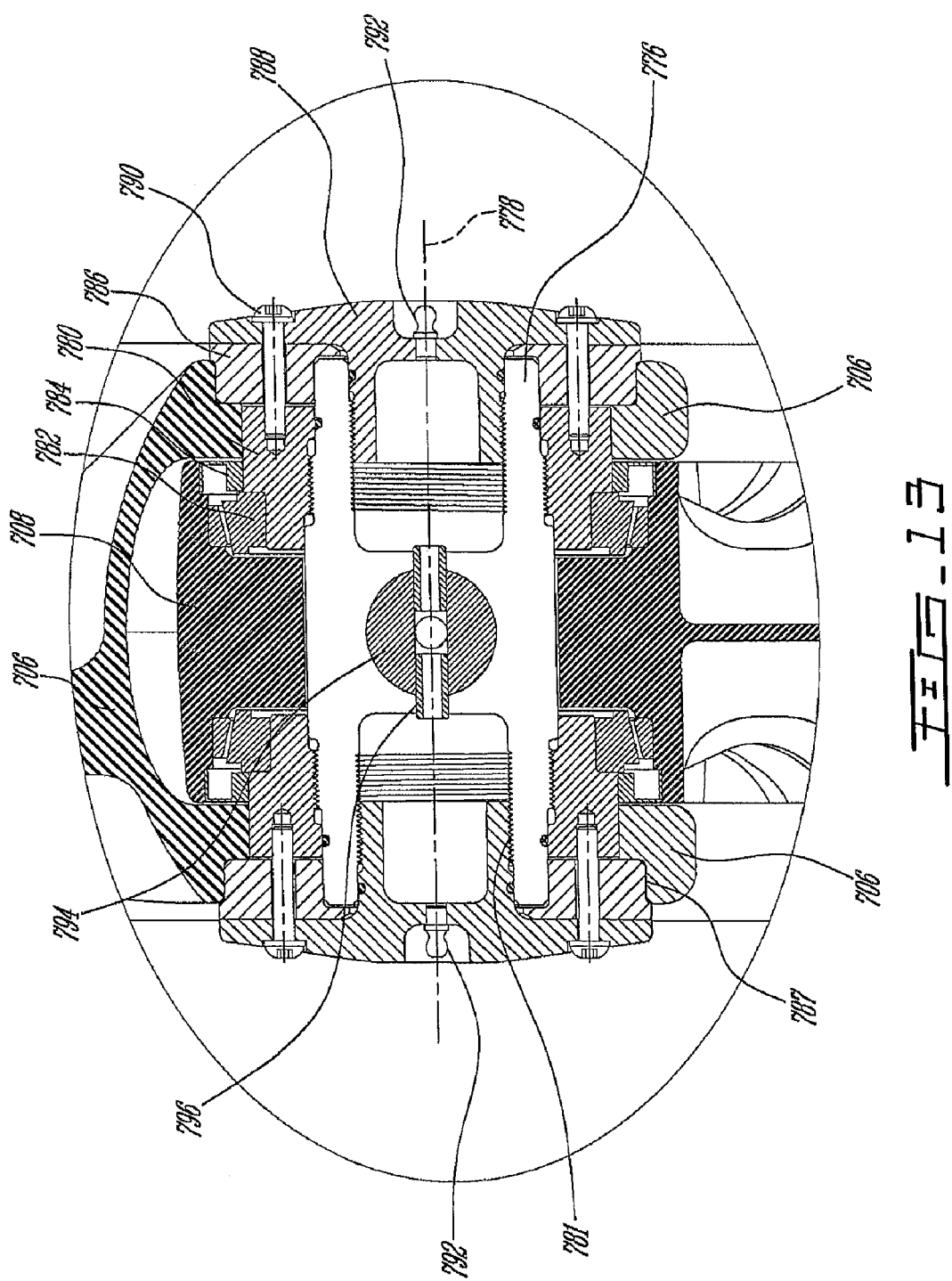
FIG. 13 is an enlarged cross-sectional view of a tandem portion of the suspension unit of FIG. 3.

FIG. 13 illustrates an exemplary pivotal junction between the hub 706 and the tandem 708. The pivotal junction has two main roles: 1) it provides to the tandem 708 its ability to pivot, and 2) it limits the angular pivotal motion of the tandem 708 about the hub 706.

The assembly uses a pivot member 776 that defines a tandem pivot axis 778. A bearing support 780 is secured to the pivot member 776 with threads 781. The bearing support 780 is adapted to receive and secure an intervening bearing 782 and a bearing seal 784. The bearing support 780 is further pivotally secured to the hub 706 with a locating member 786 selectively mating with the hub 706 defining a corresponding shape 787 (best illustrated in FIG. 6). The locating member 786 is covered by a cap 788 and fastened with a series of fasteners 790. A grease nipple 792 is provided through the cap 788 to add lubricant to the assembly and prevent mechanical friction therein.

The angular pivotal motion of the tandem 708 is limited by a limiter 794 located in an opening in the pivot member 776 and secured thereto by a spring pin 796 or the like. The limiter 794 extends from the pivot member 776 in a groove 795 located in the hub 706 (the groove 795 is not visible on FIG. 13 but is illustrated on FIG. 6). The groove 795 is defined by sidewalls of which the positions define the angular limits of the movements of the tandem 708.

Figure 14:
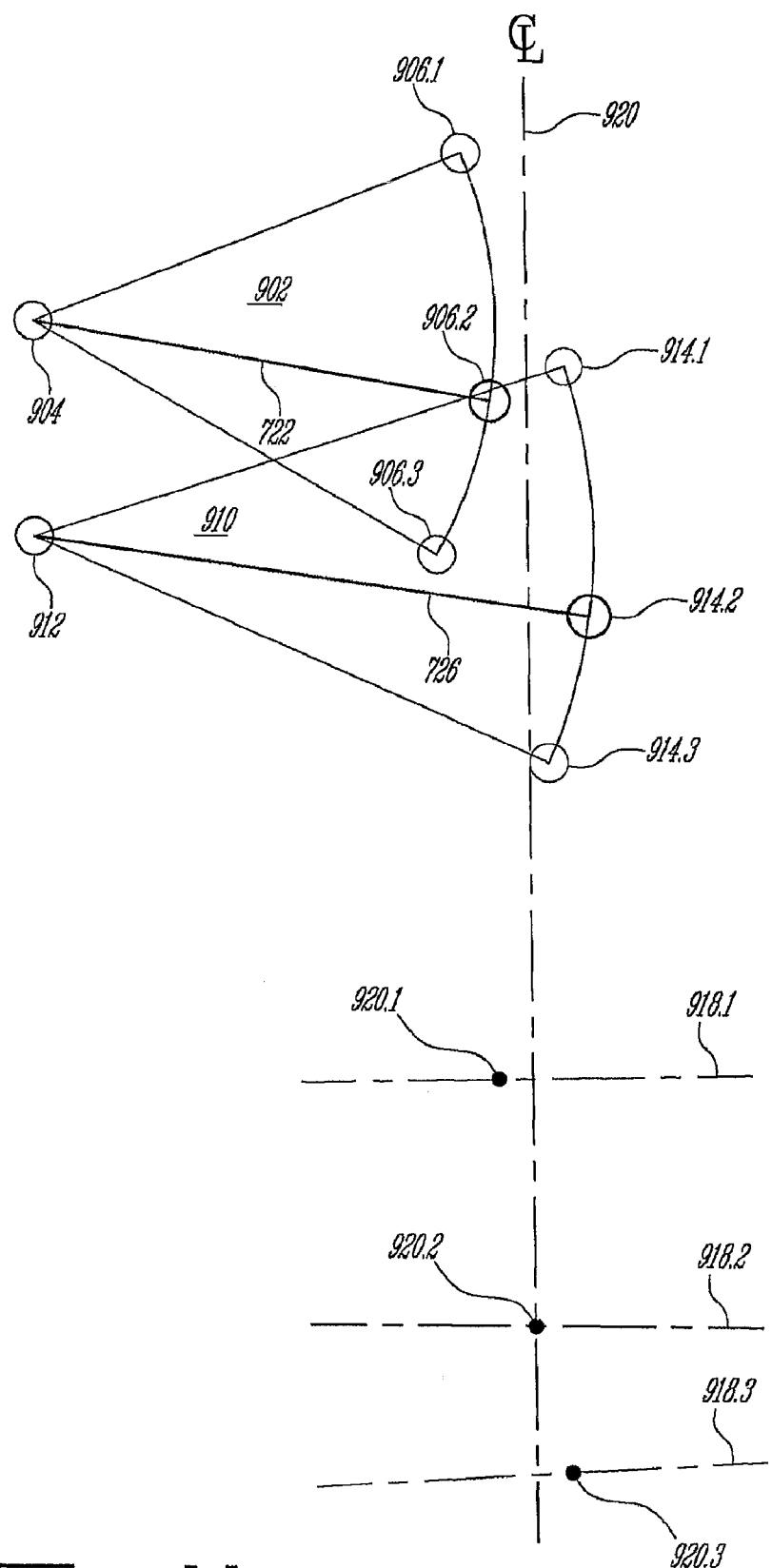
FIG. 14 is a schematic illustration of the travel of the suspension unit of FIG. 3.

Turning now to FIG. 14 schematically illustrating the limit positions of several parts of the suspension unit 702, the schematic first triangle 902 illustrates the travel of the upper wishbone 722 between the pivot junctions 904 of the upper wishbone 722 with the wishbone support 724 and between the pivot junctions 906 of the upper wishbone 722 with the hub 706. The second schematic triangle 910 illustrates the travel of the lower wishbone 726 between the pivot junctions 912 of the lower wishbone 726 with the wishbone support 724 and between the pivot junctions 914 of the lower wishbone 726 with the hub 706.

On FIG. 14 the pivot junction 906 position of the upper wishbone 722 with the hub 706 is illustrated in its uppermost position 906.1, its nominal position 906.2 and its lowermost position 906.3. Similarly, the pivot junction 914 position of the lower wishbone 726 with the hub 706 is illustrated in its uppermost position 914.1, its nominal position 914.2 and its lowermost position 914.3. The corresponding positions of the contact of the support wheel 710 with the endless belt 404 are also depicted by a series of lines 918 on FIG. 14. Endless belt uppermost position 918.1, endless belt nominal position 918.2 and endless belt lowermost position 918.3 are illustrated. The respective endless belt positions 918 are also illustrated with their respective angle about the endless belt centerline 920. In the present illustrative embodiment, the angle variation between the uppermost endless belt position 918.1 and the lowermost endless belt position 918.3 angle is of about 3.6°. This angle can easily be managed by the torsional flexibility of the endless belt 404. In other words, the complete vertical travel of a suspension unit 702 has almost no effect on the angle of the endless belt 404.

It can also be appreciated from FIG. 14 that the suspension wheels centerline 920 has a lateral displacement between the endless belt uppermost position 918.1, the endless belt nominal position 918.2 and endless belt lowermost position 918.3 of about less than 3-4 millimeters. That limited lateral displacement of the suspension wheels centerline 920 is desirable to prevent the endless belt 404 from longitudinally arching.

Figure 15:
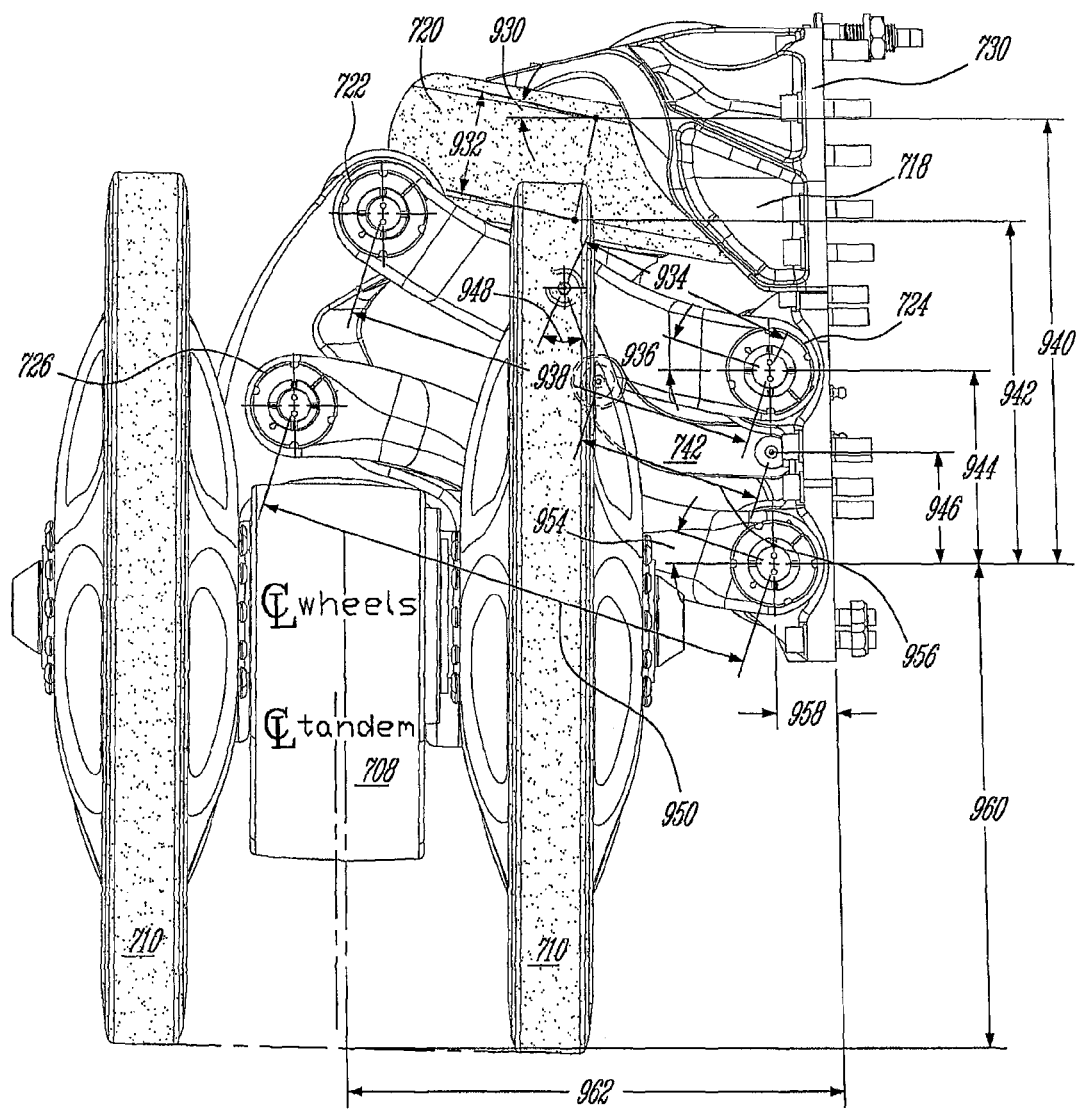
FIG. 15 is an elevation view of the suspension unit of FIG. 3 in its uppermost position.
Figure 16:
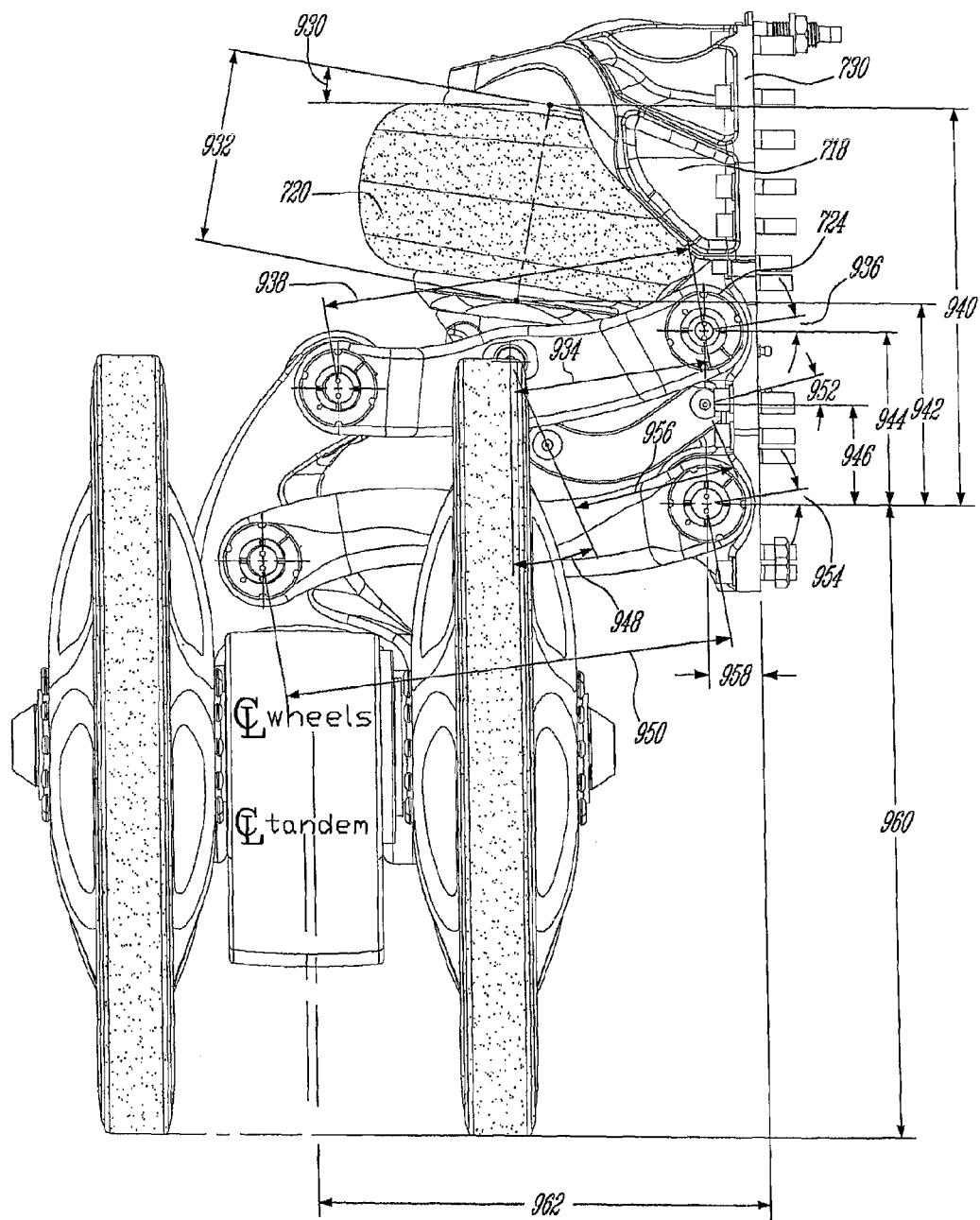
FIG. 16 is an elevation view of the suspension unit of FIG. 3 in its nominal position.

FIGS. 15 to 17 illustrate the present exemplary embodiment in more details. FIG. 15 depicts the suspension unit 702 in its uppermost position. FIG. 16 depicts the suspension unit 702 in its nominal position and FIG. 17 depicts the suspension unit 702 in its lowermost position. Corresponding distances and angles identified on these Figures are inserted in the following Table 1 for the reader's convenience.

TABLE 1

| Reference number | Uppermost endless belt position (FIG. 14) | Nominal endless belt position (FIG. 15) | Lowermost endless belt position (FIG. 16) |
| --- | --- | --- | --- |
| 930 | 13° | 10° | 4° |
| 932 | 604 mm | 1297 mm | 1707 mm |
| 934 | 1285 mm | 1285 mm | 1285 mm |
| 936 | 22° | −9° | −30° |
| 938 | 2416 mm | 2416 mm | 2416 mm |
| 940 | 2585 mm | 2585 mm | 2585 mm |
| 942 | 1996 mm | 1309 mm | 1124 mm |
| 944 | 1124 mm | 1124 mm | 1124 mm |
| 946 | 565 mm | 565 mm | 565 mm |
| 948 | 20° | 23° | 29° |
| 950 | 2921 mm | 2921 mm | 2921 mm |
| 952 | 22° | −15° | −39° |
| 954 | 18° | −8° | −24° |
| 956 | 1071 mm | 1071 mm | 1071 mm |
| 958 | 342 mm | 342 mm | 342 mm |
| 960 | 2832 mm | 4135 mm | 4921 mm |
| 962 | 2880 mm | 2920 mm | 2941 mm |

FIGS. 18 to 22 illustrate a second suspension unit 702a, with FIG. 22 further showing a third suspension unit 702b. Both the second and third suspension units 702a and 702b have a double tandem configuration, which includes a main tandem 708a (similar to tandem 708 of FIG. 3) pivotally mounted to the hub 706a, and a secondary tandem 708b pivotally mounted to the main tandem 708a. Such a double tandem configuration provides a better contact with the endless belt 404. Suspension wheels 710a are mounted to the main tandem 708a, and suspension wheels 710b are mounted to the secondary tandem 708b.

There are four suspension wheels 710a on the main tandem 708a of each of the second and third suspension units 702a and 702b. There is one suspension wheel 710b in the second suspension unit 702a, and there are two suspension wheels 710b in the third suspension unit 702b. With this offset configuration, there can be an overlap between the suspension wheel 710b of the second suspension unit 702a and the two suspension wheels 710b of the third suspension unit 702b; in other words, the suspension wheel 710b of the second suspension unit 702a can be positioned partly between the two suspension wheels 710b of the third suspension unit 702b, thereby decreasing the risk of disengagement of the endless belt.

The double wishbone configuration 704a of the suspension units 702a and 702b includes an upper wishbone 722a and a lower wishbone 726a. As best seen in FIGS. 18 and 21, the main tandem 708a is pivotally mounted to the hub 706a such that the main tandem 708a extends between the upper and lower wishbones 722a and 726a, thereby providing a strong junction.

The upper and lower wishbones 722a and 726a are connected at first ends thereof to a wishbone support 724a, and at second ends thereof to the hub 706a. A pneumatic suspension mechanism 716a, similar to the pneumatic suspension mechanism 716 of FIG. 3, includes an upper pneumatic airbag support 718a that receives a pneumatic airbag 720a.

The description and the drawings that are presented herein are meant to be illustrative of the present invention. They are not meant to be limiting of the scope of the present invention. Modifications to the embodiments described may be made without departing from the present invention, the scope of which is defined by the following claims:

I claim:

1. A suspension assembly for an endless belt drive, the suspension assembly comprising:
   a first wishbone adapted to pivotally secured, at a first end thereof, to a frame of a vehicle;

a second wishbone adapted to be pivotally secured, at a first end thereof, to the frame the first wishbone pivotally connecting the hub at a second end thereof, the second wishbone pivotally connecting the hub at a second end thereof, the hub being adapted to move vertically in respect with the frame in accordance with the angular displacement of the first wishbone and the second wishbone;

a tandem member including a first end and a second end thereof, the tandem member being pivotally secured to the hub; and at least two wheels being respectively attached to the first end and the second end of the tandem member, the at least two wheels being adapted to contact the endless belt to support the vehicle.

2. The suspension assembly of claim 1, wherein the at least two wheels are at least two pairs of wheels.

3. The suspension assembly of claim 1, wherein the tandem member is pivotally secured to the hub at a pivot substantially located in the middle of the distance separating the at least two wheels.

4. The suspension assembly of claim 1, wherein the hub is pivotally secured on two sides thereof by the first wishbone and the second wishbone.

5. The suspension assembly of claim 1, wherein the first wishbone and the second wishbone are respectively proximally pivotally connected to a wishbone support intervening between the first wishbone and the second wishbone and the frame.

6. The suspension assembly of claim 1, further comprising a pneumatic airbag suspending the hub in respect with the frame.

7. The suspension assembly of claim 6, further comprising a lower pneumatic airbag support connected to the pneumatic airbag and pivotable about one of the wishbones and a stabilization member, the stabilization member being connected to the lower pneumatic airbag support to define an angle thereof relative to the suspension displacement.

8. The suspension assembly of claim 6, wherein an air compressor is operatively connected to changes a pressure in an auxiliary fluid reservoir operatively connected to the pneumatic airbag in function of at least one factor selected from the group consisting of a mass distribution of the vehicle, a longitudinal inclination of the vehicle and a distance between the frame of the vehicle and the ground.

9. The suspension assembly of claim 1, wherein a lateral displacement of the at least two wheels along the vertical travel of the suspension is about less than 5 millimeters.

10. A vehicle equipped with a suspension assembly for an endless belt drive, the suspension assembly comprising:

a first wishbone adapted to be pivotally secured, at a first end thereof, to a frame of a vehicle;

a second wishbone adapted to be pivotally secured, at a first end thereof, to the frame the first wishbone pivotally connecting the hub at a second end thereof, the second wishbone pivotally connecting the hub at a second end thereof, the hub being adapted to move vertically in respect with the frame in accordance with the angular displacement of the first wishbone and the second wishbone;

a tandem member including a first end and a second end thereof, the tandem member being pivotally secured to the hub; and at least two wheels being respectively attached to the first end and the second end of the tandem member, the at least two wheels being adapted to contact the endless belt to support the vehicle.

11. The vehicle of claim 10, wherein the at least two wheels are at least two pairs of wheels.

12. The vehicle of claim 10, wherein the hub is pivotally secured on two sides thereof by the first wishbone and the second wishbone.

13. The vehicle of claim 10, wherein the first wishbone and the second wishbone are respectively proximally pivotally connected to a wishbone support intervening between the first wishbone and the second wishbone and the frame.

14. The vehicle of claim 10, further comprising a pneumatic airbag suspending the hub in respect with the frame.

15. The vehicle of claim 14, further comprising a lower pneumatic airbag support connected to the pneumatic airbag and adapted to pivot about one of the wishbones and a stabilization member, the stabilization member being connected to the lower pneumatic airbag support to define an angle thereof relative to the suspension displacement.

16. The vehicle of claim 10, wherein a lateral displacement of the at least two wheels along the vertical travel of the suspension is about less than 5 millimeters.

17. A suspension assembly kit for an endless belt drive, the kit comprising:

a first wishbone adapted to be pivotally secured, at a first end thereof, to a frame of a vehicle;

a second wishbone adapted to be pivotally secured, at a first end thereof, to the frame the first wishbone pivotally connecting the hub at a second end thereof, the second wishbone pivotally connecting the hub at a second end thereof, the hub being adapted to move vertically in respect with the frame in accordance with the angular displacement of the first wishbone and the second wishbone;

a tandem member including a first end and a second end thereof, the tandem member being pivotally secured to the hub; and at least two wheels being adapted to be respectively attached to the first end and the second end of the tandem member, the at least two wheels being further adapted to contact the endless belt to support the vehicle.

18. The suspension assembly kit of claim 17, wherein the at least two wheels are at least two pairs of wheels.

19. The suspension assembly kit of claim 17, further comprising a wishbone support and wherein the first wishbone and the second wishbone are adapted to be respectively proximally pivotally connected to the wishbone support intervening between the first wishbone and the second wishbone and the frame.

20. The suspension assembly kit of claim 17, further comprising a pneumatic airbag adapted to suspend the hub in respect with the frame.

21. The suspension assembly kit of claim 20, further comprising a lower pneumatic airbag support adapted to be connected to the pneumatic airbag and adapted to pivot about one of the wishbones and a stabilization member, the stabilization member being adapted to be connected to the lower pneumatic airbag support to define an angle thereof relative to the suspension displacement.

22. The suspension assembly kit of claim 17, wherein an air compressor is adapted to be activated to change a pressure in an auxiliary fluid reservoir adapted to be operatively connected to the pneumatic airbag in function of at least one factor selected from the group consisting of a mass distribution of the vehicle, a longitudinal inclination of the vehicle and a distance between the frame of the vehicle and the ground.

* * * * *